(12) United States Patent
Aoki

(10) Patent No.: US 6,697,921 B1
(45) Date of Patent: Feb. 24, 2004

(54) SIGNAL PROCESSOR PROVIDING AN INCREASED MEMORY ACCESS RATE

(75) Inventor: Toru Aoki, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/831,300
(22) PCT Filed: Sep. 8, 1999
(86) PCT No.: PCT/JP99/04863
§ 371 (c)(1), (2), (4) Date: Aug. 7, 2001
(87) PCT Pub. No.: WO01/18639
PCT Pub. Date: Mar. 15, 2001

(30) Foreign Application Priority Data

Mar. 11, 1998 (JP) .......................................... 10-059391

(51) Int. Cl.⁷ .............................................. G06F 12/00
(52) U.S. Cl. .................. 711/154; 710/305; 710/306; 710/307; 714/48
(58) Field of Search ................. 711/154; 710/39, 710/36, 305–307, 310; 714/48

(56) References Cited

U.S. PATENT DOCUMENTS

| | | | | |
|---|---|---|---|---|
| 5,613,078 A | * | 3/1997 | Kishigami | 710/307 |
| 5,974,493 A | * | 10/1999 | Okumura et al. | 710/307 |
| 6,047,348 A | * | 4/2000 | Lentz et al. | 710/307 |
| 6,125,432 A | * | 9/2000 | Hanami et al. | 711/157 |
| 6,185,633 B1 | * | 2/2001 | Johnson | 710/22 |
| 6,272,583 B1 | * | 8/2001 | Sakugawa et al. | 710/307 |

FOREIGN PATENT DOCUMENTS

| | | |
|---|---|---|
| JP | 2-3163 | 1/1990 |
| JP | 4-195234 | 11/1992 |
| JP | 9-330181 | 12/1997 |

* cited by examiner

Primary Examiner—Mano Padmanabhan
Assistant Examiner—Jasmine Song
(74) Attorney, Agent, or Firm—Wenderoth, Lind & Ponack, L.L.P.

(57) ABSTRACT

The bus width of the data bus among blocks for transferring data among respective blocks such as the memory control block, the error correction block, and the host I/F block is 32-bit width, and the bus width of the memory data bus for transferring data between the buffer memory and the memory control block is 64-bit width, whereby an access to the buffer memory is performed by the unit of 64 bits, while respective block processings are performed by the unit of 32 bits out of the 64 bits. Therefore, 32-bit data transferred through the data bus among blocks are always valid data, whereby the access rate from respective blocks in the system to the buffer memory can be increased.

5 Claims, 6 Drawing Sheets

Fig.3

| even 0000 | odd 0000 | even 0001 | odd 0001 | even 0002 | odd 0002 | . | . | . | . |
|---|---|---|---|---|---|---|---|---|---|
| even 0043 | odd 0043 | even 0044 | odd 0044 | even 0045 | odd 0045 | . | . | . | . |
| even 0086 | odd 0086 | even 0087 | odd 0087 | even 0088 | odd 0088 | . | . | . | . |
| even 0129 | odd 0129 | even 0130 | odd 0130 | even 0131 | odd 0131 | . | . | . | . |
| even 0172 | odd 0172 | even 0173 | odd 0173 | even 0174 | odd 0174 | . | . | . | . |
| even 0215 | odd 0215 | even 0216 | odd 0216 | even 0217 | odd 0217 | . | . | . | . |
| even 0258 | odd 0258 | even 0259 | odd 0259 | even 0260 | odd 0260 | . | . | . | . |
| even 0301 | odd 0301 | even 0302 | odd 0302 | even 0303 | odd 0303 | . | . | . | . |
| even 0344 | odd 0344 | even 0345 | odd 0345 | even 0346 | odd 0346 | . | . | . | . |

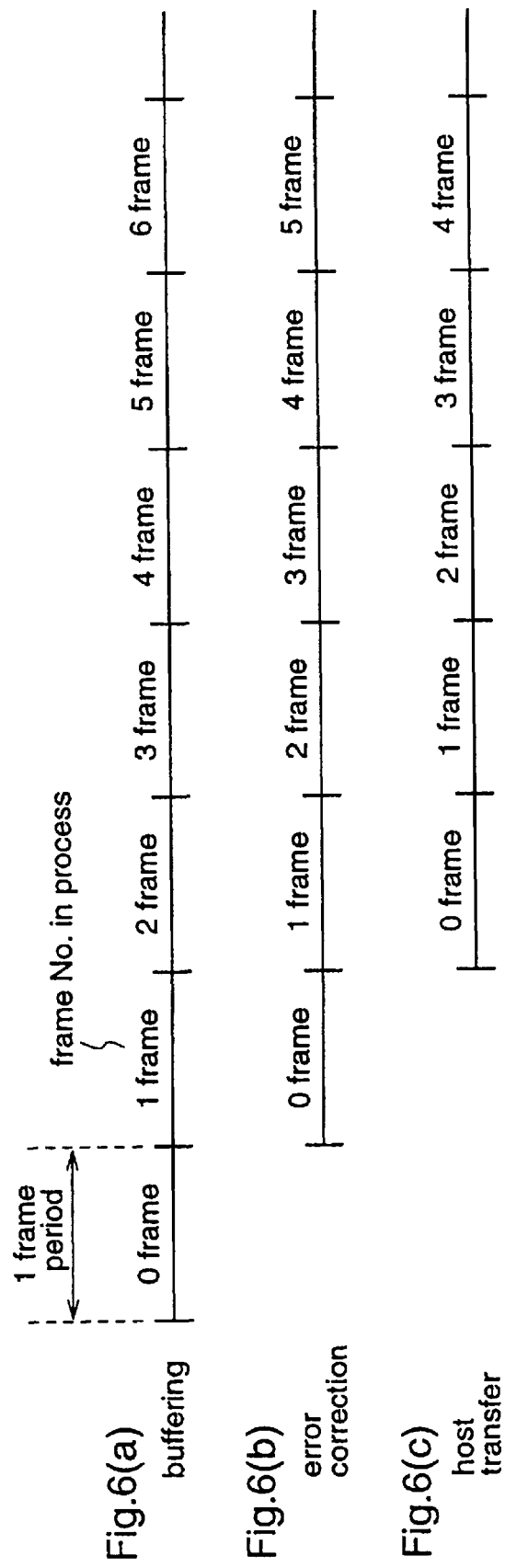

SIGNAL PROCESSOR PROVIDING AN INCREASED MEMORY ACCESS RATE

TECHNICAL FIELD

The present invention relates to a signal processor at the recording and the reproduction which is applicable to an external memory of a computer or the like, and more particularly, to that which increases the efficiency of an access to the memory.

BACKGROUND ART

A description will be given of a signal processing LSI including a memory such as a CD-ROM, with reference to FIGS. 5 and 6. In FIG. 5, numeral 11 denotes a recording medium such as a CD-ROM, numeral 12 denotes a buffer memory for storing data, numeral 13 denotes a host computer, numeral 14 denotes a decoder block which takes in data from the recording medium 11, numeral 15 denotes a memory control block which arbitrates memory access requests from respective blocks to perform a memory access, numeral 16 denotes an error correction block which performs error correction when there is an error in the data stored in the buffer memory 12, numeral 17 denotes a host I/F block for transferring data stored in the buffer memory 12 to the host computer 13, numeral 18 denotes a data bus of 16 bit width between blocks for transferring data between respective blocks and the memory control block 15, and numeral 19 denotes a memory data bus of 16 bit width for transferring data between the buffer memory 12 and the memory control block 15.

Next, a signal processing will be described by focusing on a buffering processing of the transfer from the recording medium 11 to the buffer memory 12, an error correction processing, and a host transfer processing of data after correction.

(1) Buffering Processing

In the recording medium 11, CD-ROM data are recorded in an interleaved manner in a prescribed data unit. A frame is composed of data of 1176 words (word=16 bits), and the data read from the recording medium 11 are inputted to the decoder block 14 as serial data. In the decoder block 14, a frame synchronizing signal is detected and a serial/parallel conversion is performed, and thereafter, data of 1170 words excluding the frame synchronizing signal are transferred to the memory control block 15 through the data bus 18 between blocks of 16 bit width. The memory control block 15 writes the received data into the buffer memory 12 through the memory data bus 19 of 16-bit width.

(2) Error Correction Processing

After data for one frame are stored in the buffer memory 12, the error correction block 16 accesses the buffer memory 12 through the data bus 18 between blocks, the memory control block 15, and the memory data bus 19, thereby to perform an error correction processing for one frame.

(3) Host Transfer Processing

After the error correction processing for data of at least one frame is completed, the host I/F block 17 reads data through the memory data bus 19, the memory control block 15, and the data bus 18 between blocks, and transfers the data to the host computer 13.

Since the above-described buffering, error correction, and host transfer are processed by pipeline control as depicted in FIGS. 6(a), (b), (c), respectively, the buffering and the error correction processing are required to complete processings for one frame within 1-frame time. However, the host transfer does not necessarily require processing for one frame to be completed within 1-frame time, and figure 6(c) shows that in case of host transfer, transfer of data for a corresponding frame is possible at a timing described therein.

FIG. 4 shows a logical format for a CD-ROM and illustrates the configuration of data for one frame excluding the frame synchronizing signal, and further, in the CD-ROM, data of 2340 bytes out of 2352 bytes of one frame, excluding the frame synchronizing signal of 6×2 bytes, are divided into ones of even numbers and ones of odd numbers, so as to perform an error correction processing for respectively independent groups of 1170-byte data.

In FIG. 4, data of 2340 bytes for one frame are shown correspondingly to word numbers (1 word =16 bits) of 0 to 1169. In a CD-ROM, error correcting codes of P parity and Q parity are added, and the error correction processing employing P parity is performed employing data with intervals of 43 words such as 0th word, 43rd word, . . . , while the error correction processing employing Q parity is performed employing data with intervals of 44 words such as 0th word, 44th word, . . . , as shown in FIG. 4.

As described above, when attempting to improve the processing speed of error correction employing a conventional signal processor by extending the width of the memory data bus of the buffer memory 12, there is a problem such that it is not possible to perform a memory access for error correction efficiently by the conventional method of storing data to the buffer memory 12.

More particularly, when it is considered that the processing speed of error correction is enhanced by extending the width of the memory data bus of the buffer memory 12, when data read from the recording medium 11 is stored into the buffer memory 12 in order, that is, when storing is performed according to the logical format of a CD-ROM in FIG. 4, a memory access for error correction can not be performed efficiently in a case where the width of the memory data bus of the buffer memory 12 is over 16 bits such as, for example, when it is 64 bits.

With reference to FIG. 4, in case of error correction employing P parity, data of 64 bits in total are read in the order of word numbers 0000 and 0001 initially, and word numbers 0042 and 0043 subsequently, by an access to the buffer memory 12 by 32-bit bus 18. However, since data with intervals of 43 words are used for calculation and thereby, data of word numbers 0000 and 0043 only are calculated, 32-bit data of word numbers 0001 and 0042 are not used. Similarly, at the error correction employing Q parity, data of 64 bits in total are read in the order of word numbers 0000 and 0001 initially, and word numbers 0044 and 0045 subsequently, and data with intervals of 44 words are used for calculation, and therefore, data of word numbers 0000 and 0044 only are processed, and 32-bit data of word numbers 0001 and 0045 are not used.

SUMMARY OF THE INVENTION

According to a first aspect of the present invention, there is provided a signal processor which performs an access from plural blocks toward a buffer memory connected to a memory data bus having the first bus width through a memory control block, so as to perform reading of data, the signal processor comprising: a memory control block which performs writing of data into the buffer memory and reading of data stored in the buffer memory from the buffer memory through the memory data bus; and a data bus among blocks which has the second bus width narrower than that of the first bus width, and which transfers the data among the plural blocks and the memory control block; wherein the memory control block relocates data on the memory data bus to the data bus among blocks when performing reading of data from the buffer memory, and relocates data on the data bus among blocks to the memory data bus when performing writing of data into the buffer memory. Therefore, the number of memory access is reduced and a fast access is performed toward the buffer memory, whereby it is possible to increase the efficiency of the memory access as well as to downsize a circuit.

According to a second aspect of the present invention, the signal processor of the first aspect further comprises: an error correction block which is connected to the buffer memory through the memory control block, and which performs error correction processings of data for at least two frames which are stored in the buffer memory at the same time. Therefore, data for plural frames stored in the buffer memory are subjected to the error correction processing at the same time, thereby reducing unnecessary memory access.

According to a third aspect of the present invention, there is provided a signal processor of the first aspect, in which the memory control block, when storing data of successive N frames comprising prescribed word numbers into the buffer memory from a recording medium, stores first frame data into the buffer memory at intervals of N−1 word, stores second frame data at intervals of N−1 word so as to adjoin the first frame data, and stores the rest of Nth frame data subsequently at intervals of N−1 word so as to adjoin N−1th frame data, and N pieces of word data of different frames are stored successively in the buffer memory. Therefore, the width of the bus to the buffer memory is extended to reduce the number of memory access, whereby it is possible to increase the efficiency of an access to the buffer memory.

BRIEF DESCRIPTION OF THE DRAWINGS

FIG. 3 is a diagram schematically illustrating a format of data storage into a buffer memory of the signal processor according to the embodiment of the invention;

FIG. 6 is a diagram illustrating a pipeline control of the conventional signal processor.

DESCRIPTION OF THE PREFERRED EMBODIMENTS

Embodiment 1

Hereinafter, a first embodiment of the present invention will be described with reference to FIGS. 1 to 3.

Figure 1:
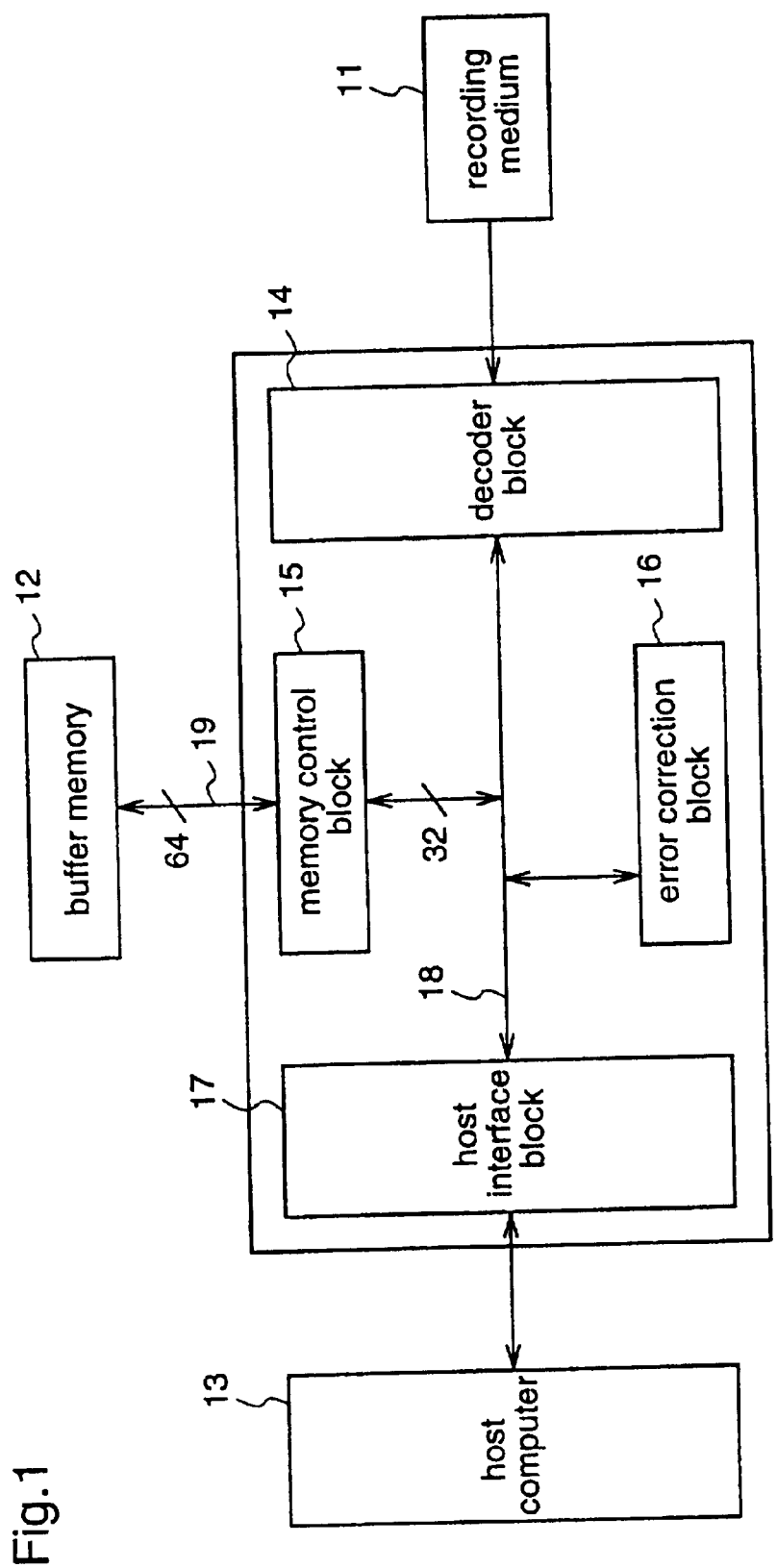
FIG. 1 is a block diagram illustrating a signal processor according to an embodiment of the present invention.

In FIG. 1, while the basic configuration is the same as that of a conventional apparatus, there is a difference in that the bus width of a data bus 18 among blocks for transferring data among respective blocks such as a memory control block 15, an error correction block 16, and a host I/F block 17 is 32-bit width, and the bus width of a memory data bus 19 for transferring data between a buffer memory 12 and the memory control block 15 is 64-bit width.

Data for successive two frames (an "even" frame and an "odd" frame) are stored in the buffer memory 12 so that data of the same word numbers should adjoin each other as shown in FIG. 3. With this memory storage format, an efficient memory access at the error correction can be realized. The operations of (1) buffering processing, (2) error correction processing, (3) host transfer processing as the signal processor will be described in the following.

(1) Buffering Processing

Serial data read from a recording medium 11 is taken into a decoder block 14. The decoder block 14 performs serial/parallel conversion on the data taken in to transfer them to the memory control block 15 through the data bus 18 of 32-bit width among blocks. Further, the decoder block 14 also transfers address information of the buffer memory 12 to access to the memory control block 15. The memory control block 15 stores data into the buffer memory 12 so that they match the storage format described in FIG. 3, according to the address information sent from the decoder block 14. Specifically, two words of successive-two-word data of a same frame, which is sent from the decoder block 14, are interspaced from each other for one word so that word data of the same word number of a different frame are stored in this space, whereby 32-bit data are relocated on the memory data bus 19 of 64-bit width and written into the buffer memory 12.

(2) Error Correction Processing

After data for two frames (4680 bytes) are stored in the buffer memory 12, the error correction block 16 transfers the address information to read the data from the buffer memory 12 to the memory control block 15. The memory control block 15 reads the data from the buffer memory 12 through the memory data bus 19 of 64-bit width according to the address information sent from the error correction block 16, relocates a total of two-word data of an "even" frame and an "odd" frame, having same word number shown in FIG. 3, onto the data bus 18 among blocks, and transfers them to the error correction block 16. In the error correction block 16, the error correction processing is performed by the byte unit. That is, the data read from the memory control block 15 are inputted to four syndrome calculators and processed in parallel. From respective results of syndrome calculations, the position and pattern of error are calculated, and when there is an error, the error correction block 16 transfers the address information as well as transfers error pattern information to the memory control block 15 through the data bus 18. The memory control block 15 reads data from the buffer memory 12 through the memory data bus 19 according to the address information received from the error correction block 16, corrects the data by means of the error pattern information, and writes the data into the buffer memory 12 through the memory data bus 19.

Figure 2:
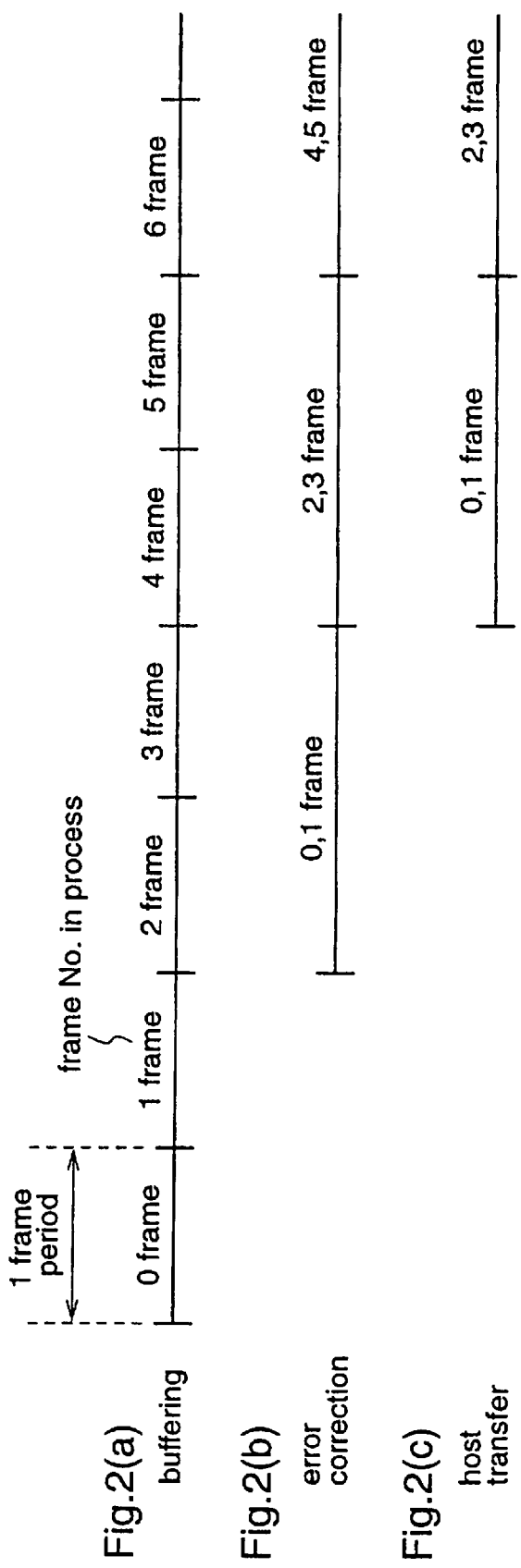
FIG. 2 is a diagram illustrating a pipeline control of the signal processor according to the embodiment of the invention.
Figure 4:
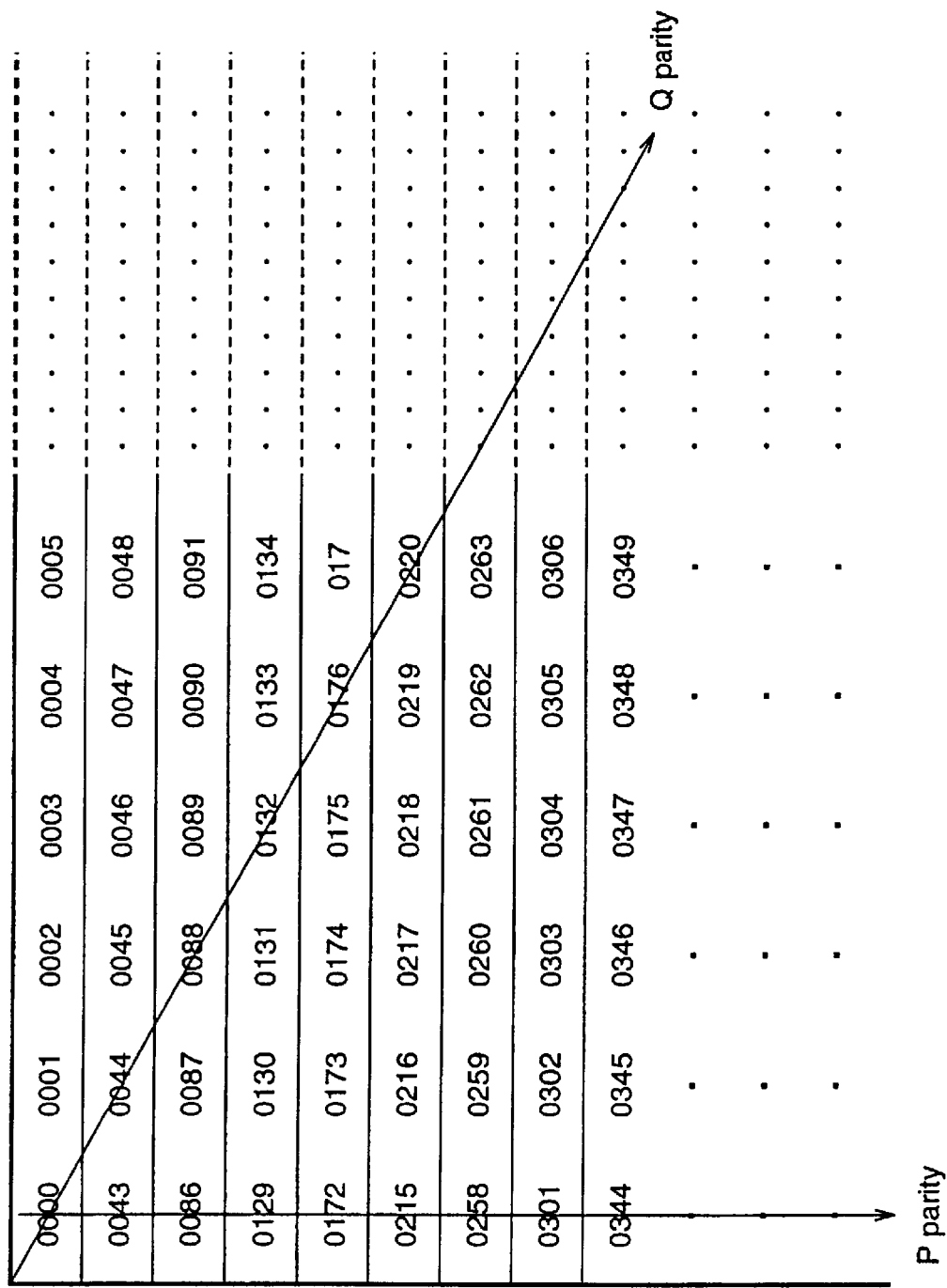
FIG. 4 is a diagram illustrating a conventional logical format of a CD-ROM.
Figure 5:
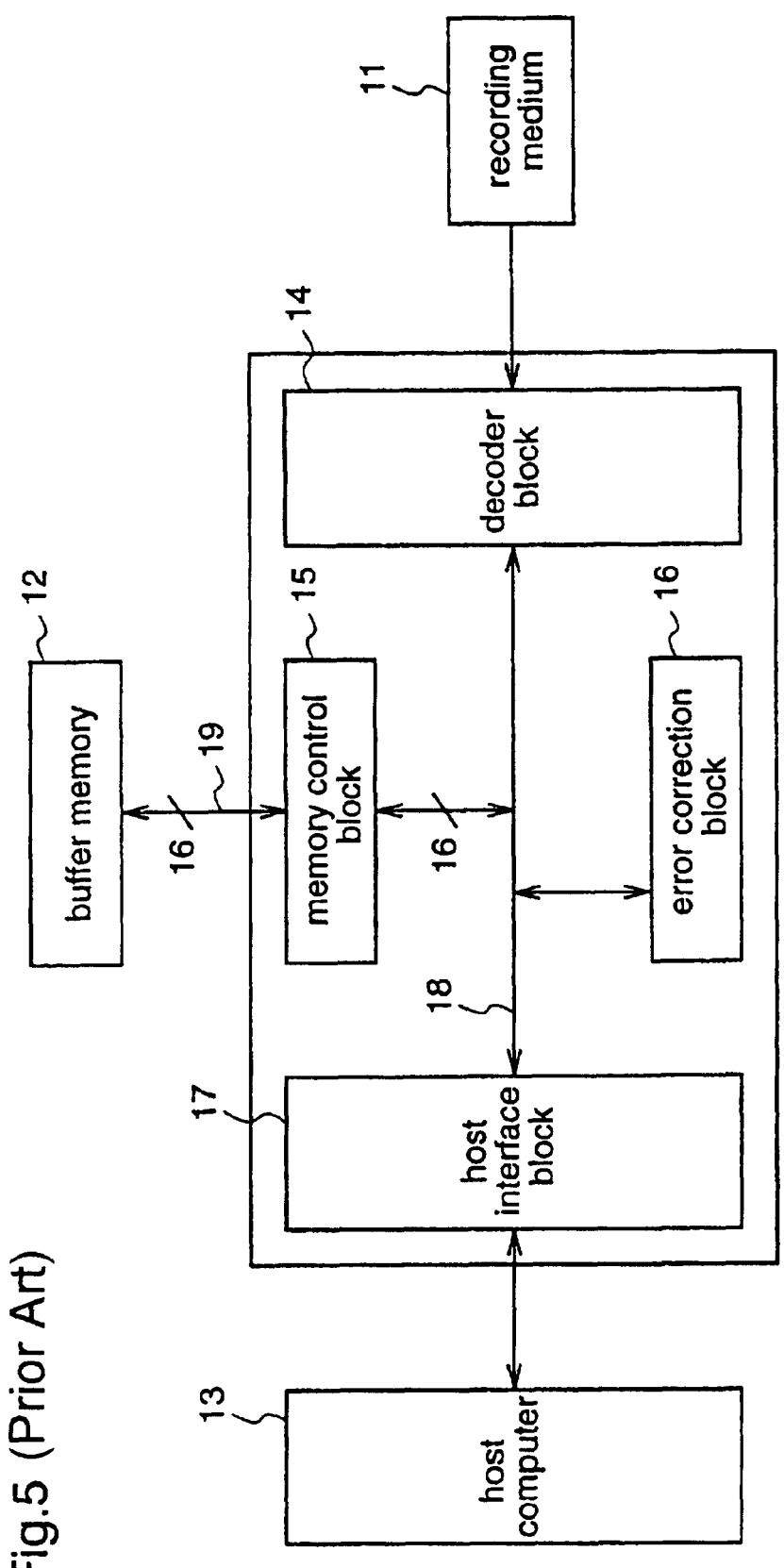
FIG. 5 is a block diagram illustrating a conventional signal processor.

FIG. 2 is a diagram for explaining a pipeline control according to this embodiment, and since the pipeline control is performed by the two-frame unit in the embodiment, the error correction is performed after the buffering of two frames shown in FIG. 2(a) is completed, and the host transfer is performed after the error correction processing of two frames shown in FIG. 2(b) is completed, as described in respective FIGS. 2(b) and 2(c). As described above, each block processing is performed for two frames at a time by the 32-bit unit, thereby enhancing the access efficiency.

More specifically, as shown in FIG. 3, at the correction processing of P parity, the buffer memory 12 is accessed by the 64 bits of respective two words of successive 0th frame and 1st frame, and out of the 64 bits, the correction processing of only 32 bits of the 0th word of the 0th frame and the 1st frame is performed, and then, the correction processing of 32 bits of the 43rd word of the 0th frame and the 1st frame is performed subsequently.

The correction processing of Q parity is performed in the same manner in which the buffer memory 12 is accessed by the 64 bits of respective two words of successive 0th frame and 1st frame, and out of the 64 bits, the correction processing of only 32 bits of the 0th word of the 0th frame and the 1st frame is performed, and then, the correction processing of 32 bits of the 44th word of the 0th frame and the 1st frame is performed subsequently. That is, while data are read from the buffer memory 12 by the unit of 64 bits, the correction processing is performed by the unit of 32 bits out of the 64 bits, whereby the number of memory accesses is reduced, increasing the memory access efficiency.

Further, while the above illustrates a case where the buffering processing which stores the above-described two-frame data into the buffer memory 12 for every other word is performed, and in this case, data for two frames are subjected to the error correction processing at the same time, it is also possible that, as the frame number to store into the buffer memory 12, data for N frame should be stored by performing the buffering every N−1 word, and in this case, it is clear that the error correction processings are performed toward the N-frame data at the same time.

(3) Host Transfer Processing

When the error correction processings toward respective data for two frames are completed, the host I/F block 17 transfers the address information to access the buffer memory 12 to the memory control block 15. The memory control block 15 reads data from the buffer memory 12 through the memory data bus 19 of 64-bit width according to the address information sent from the host I/F block 17. The memory control block 15 relocates respective two-word data of successive word numbers of a same frame among the four-word data read onto the data bus 18 of 32-bit width among blocks, and transfers them to the host I/F block 17. The host I/F block 17 transfers the received data to the host computer 13.

With this configuration, while an access to the buffer memory 12 is performed by the 64-bit unit, respective block processings are performed by the unit of 32 bits out of 64 bits so that 32-bit data transferred through the data bus 18 among blocks are always valid, whereby the access rate from respective blocks to the buffer memory 12 in the system can be increased without decreasing the efficiency of the error correction processing.

INDUSTRIAL APPLICATION

The present invention relates to the signal processor at the recording and the reproducing which is applicable to an external memory of a computer or the like and, more particularly, to one which increases the access rate to the memory, and thus, increases the processing speed of the whole signal processor.

What is claimed is:

1. A signal processor for performing an access from plural blocks toward a buffer memory connected to a memory data bus having a first bus width through a memory control block, said signal processor comprising:

a memory control block for performing a writing of data into the buffer memory and a reading of data stored in the buffer memory through the memory data bus; and a data bus provided among the blocks which has a second bus width which is narrower than the first bus width, and provided for transferring the data among the plural blocks and said memory control block;

wherein said memory control block is operable to relocate data on the memory data bus to said data bus provided among the blocks when performing reading of data from the buffer memory, and operable to relocate data on said data bus provided among the blocks to the memory data bus when performing writing of data into the buffer memory; and wherein said memory control block, when storing data of successive N frames comprising a prescribed word number into the buffer memory from a recording medium, is operable to store first frame data into the buffer memory at intervals of N−1 word, store second frame data at intervals of N−1 word so as to adjoin the first frame data, and store the rest of Nth frame data subsequently at intervals of N−1 word so as to adjoin N−1th frame data, and N pieces of word data of different frames are stored successively in the buffer memory.

2. The signal processor as defined in claim 1, further comprising:

an error correction block which is connected to the buffer memory through said memory control block, and which is operable to perform an error correction processing of data for at least two frames which are stored in the buffer memory at the same time.

3. The signal processor as defined in claim 1, wherein the first bus width of the memory data bus is 64 bits and the second bus width of said data bus is 32 bits.

4. The signal processor as defined in claim 1, further comprising:

a host interface block which is connected to said memory control block through said data bus and which is operable to transfer data received from said memory control block to a host computer.

5. The signal processor as defined in claim 1, further comprising:

a decoder block for receiving serial data read from a recording medium, performing serial/parallel conversion on the received serial data, and transferring the converted data to said memory control block through said data bus.

* * * * *